US012783373B2

(12) United States Patent
Patsidis et al.

(10) Patent No.: US 12,783,373 B2
(45) Date of Patent: Nov. 3, 2026

(54) COMMON CONTROL AND/OR OBSERVATION FOR INTERNAL STATE TRACKING

(71) Applicant: Arm Limited, Cambridge (GB)

(72) Inventors: Karyofyllis Patsidis, Cambridge (GB); Raghavendra Adiga Bandimutt, Cambridge (GB)

(73) Assignee: Arm Limited, Cambridge (GB)

( * ) Notice: Subject to any disclaimer, the term of this patent is extended or adjusted under 35 U.S.C. 154(b) by 6 days.

(21) Appl. No.: 18/801,285

(22) Filed: Aug. 12, 2024

(65) Prior Publication Data

US 2025/0377994 A1 Dec. 11, 2025

(30) Foreign Application Priority Data

Jun. 6, 2024 (EP) .................................... 24386068

(51) Int. Cl.
*G06F 11/22* (2006.01)
*G06F 11/267* (2006.01)

(52) U.S. Cl.
CPC .......... *G06F 11/221* (2013.01); *G06F 11/267* (2013.01)

(58) Field of Classification Search
None
See application file for complete search history.

(56) References Cited

U.S. PATENT DOCUMENTS

2025/0377971 A1* 12/2025 Shanmugam ........... G06F 11/08

OTHER PUBLICATIONS

SPRACR3A—Texas Instruments, "CRC Engines in C2000™ Devices," Apr. 2020—Revised May 2023 (Year: 2023).*
WCAS—Dawood Alnajjar and Mauricio Suguiy, A Comprehensive Guide for CRC Hardware Implementation (Year: 2015).*

* cited by examiner

*Primary Examiner* — Guerrier Merant
(74) *Attorney, Agent, or Firm* — Berkeley Law & Technology Group, LLP

(57) ABSTRACT

The present disclosure relates generally to integrated circuits and relates more particularly to circuits, systems, and/or processes for common control and/or observation for internal state tracking.

19 Claims, 6 Drawing Sheets

COMMON CONTROL AND/OR OBSERVATION FOR INTERNAL STATE TRACKING

This patent application claims priority from European Patent Application No. 24386068.1, entitled "COMMON CONTROL AND/OR OBSERVATION FOR INTERNAL STATE TRACKING," filed Jun. 6, 2024, incorporated herein by reference in its entirety.

BACKGROUND

Field

The present disclosure relates generally to integrated circuits and relates more particularly to circuits, systems, and/or processes for common control and/or observation for internal state tracking.

Information

Integrated circuit devices, such as processors, for example, may be found in a wide range of electronic device types. Computing devices, for example, may include integrated circuit devices, such as processors, to process signals and/or states representative of diverse content types for a variety of purposes. Over time, various techniques and technologies have evolved in an effort to test integrated circuits, such as processors, for example, to verify design and/or implementation. In some circumstances, processors, for example, may be tested via random instruction sequence (RIS) tools and/or techniques whereby a sequence of executable instructions may be executed and results compared with expected results, for example. However, challenges remain in creating testing tools and/or techniques that capture a satisfactory percentage of errors and/or that provide satisfactory coverage of the various circuits, functionalities, etc., of the device under test, for example.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
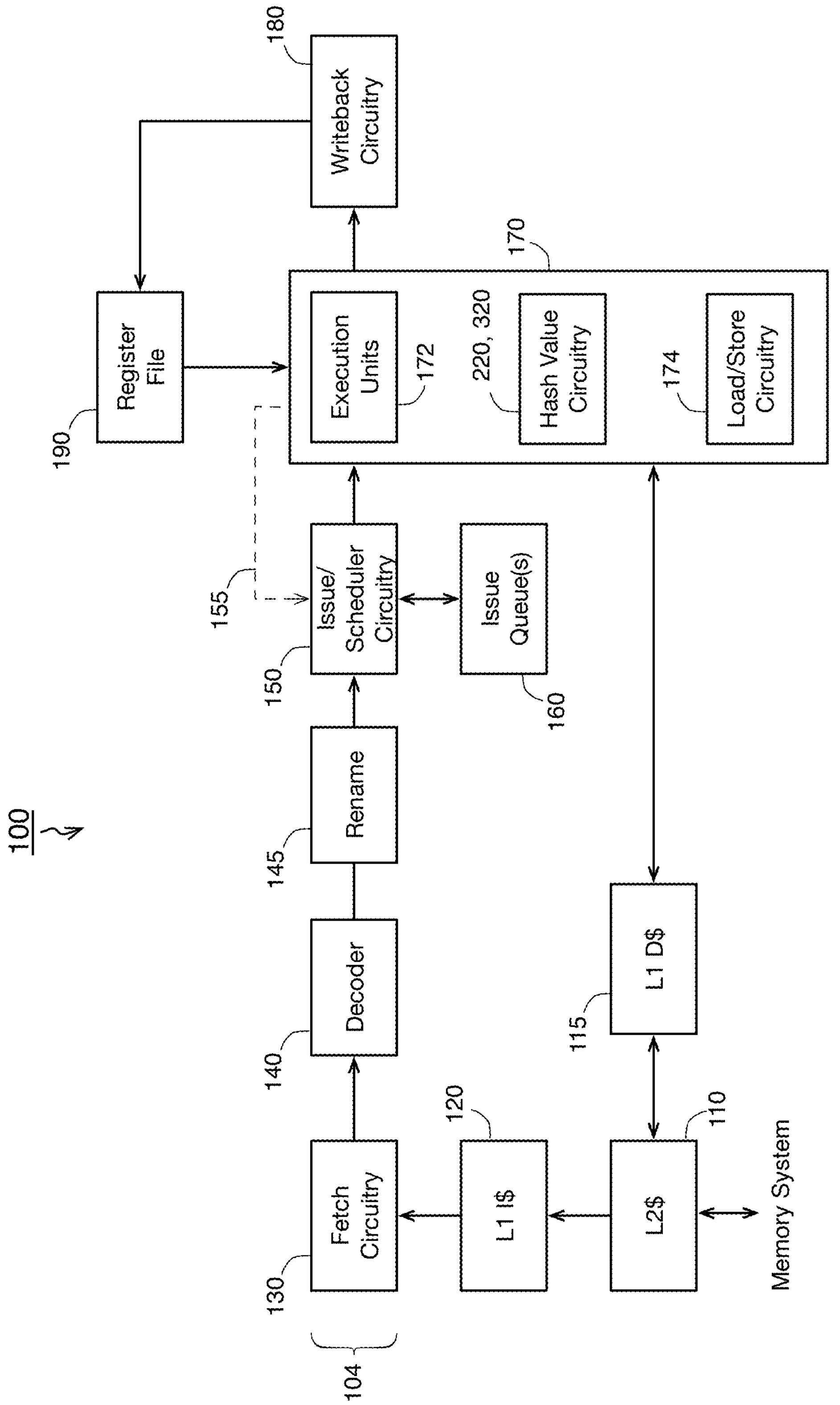
FIG. 1 is a schematic block diagram illustrating example processing circuitry, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, integrated circuit devices, such as processors, for example, may be found in a wide range of electronic device types. Computing devices, for example, may include integrated circuit devices, such as processors, to process signals and/or states representative of diverse content types for a variety of purposes. Over time, various techniques and technologies have evolved in an effort to test processors to verify design and/or implementation. In some circumstances, processors may be tested via random instruction sequence (RIS) tools and/or techniques whereby a sequence of executable instructions may be executed and results compared with expected results, for example. However, challenges remain in creating tools and/or techniques that capture a satisfactory percentage of errors and/or that provide satisfactory coverage of the various circuits, functionalities, etc., of the device under test, for example.

Non-limiting example embodiments described herein may be directed to addressing these challenges.

For example, in embodiments, an apparatus may include a hash value calculation circuit and a plurality of hardware functional units coupled to the hash value calculation circuit via a first bus, wherein the plurality of hardware functional units are individually to autonomously and unilaterally communicate respective sets of data elements to the hash value calculation circuit via the first bus, and wherein, responsive at least in part to at least one of the plurality of hardware functional units placing one or more signals representative of at least a first set of data elements on the first bus, the hash value calculation circuit is to calculate a first hash value based at least in part on the first set of data elements. In implementations, the hash value calculation circuit may calculate the first hash value for a current set of instructions of an instruction sequence test operation based at least in part on the first set of data elements and on a previously calculated hash value for a previous set of instructions of the instruction sequence test operation.

In implementations, the hash value calculation circuit may further calculate a plurality of successive hash values for a respective plurality of successive sets of instructions of the instruction sequence test operation based at least in part on one or more additional sets of data elements and further based at least in part on at least one previously calculated hash value from at least one previous set of instructions of the plurality of successive sets of instructions. In implementations, an apparatus may also include a hash value register to store the calculated first hash value.

In implementations, an apparatus may further comprise a control register and a control signal path to couple the control register to the plurality of hardware functional units, wherein the control register is to broadcast one or more configuration bits to the plurality of hardware functional units via the control signal path. In implementations, the plurality of hardware functional units may individually autonomously and unilaterally determine how to react to the one or more configuration bits. Also, in implementations, an apparatus may further comprise a second control register and a second bus to couple the second control register to the plurality of hardware functional units, wherein the second bus is to communicate one or more enable signals to the at least one of the plurality of hardware functional units based at least in part on one or more second control data elements stored in the second control register.

In implementations, at least one of the plurality of hardware functional units may place the one or more signals representative of the at least the first set of data elements on the first bus responsive at least in part to the one or more enable signals. In implementations, the hash value calculation circuit may calculate the first hash value and/or one or more additional hash values responsive at least in part to a hash value calculation enable signal communicated via the second control bus in accordance with a hash value calculation enable bit of the second control register. Also, in implementations, at least one of the plurality of hardware functional units may comprise a first buffer to temporarily store the first set of data elements prior to placing the first set of data elements on the first bus. Also, for example, an apparatus may further comprise a second buffer to temporarily store at least the first set of data elements placed on the first bus, wherein the second buffer is to provide the at least the first set of data elements to the hash value calculation circuit.

In implementations, an apparatus may comprise a processor core comprising a data processing unit and may also comprise the plurality of hardware functional units, and the data processing unit may include the hash value calculation circuit. Further, for example, the respective sets of data elements for the plurality of hardware functional units may comprise signals and/or states representative of internal state content for the respective plurality of hardware functional units. Further, in implementations, to autonomously and unilaterally communicate the respective sets of data elements to the hash value calculation circuit, the plurality of hardware functional units may individually autonomously and unilaterally select which content to include in the respective sets of data elements and/or may determine when to place the respective sets of data elements onto the first bus, for example.

Embodiments may include a process, including autonomously and unilaterally communicating, by individual functional units of a plurality of hardware functional units coupled to a hash value calculation circuit via a first bus, respective sets of data elements to the hash value calculation circuit via the first bus. A process may also include, responsive at least in part to at least one of the plurality of hardware functional units placing one or more signals representative of at least a first set of data elements on the first bus, calculating, by the hash value calculation circuit, a first hash value based at least in part on the first set of data elements, and storing the calculated first hash value in a hash value register.

In implementations, a process may further comprise calculating, by the hash value calculation circuit, a plurality of successive hash values for a plurality of successive sets of instructions of an instruction sequence test operation based at least in part on one or more additional sets of data elements and based at least in part on at least one previously calculated hash value. Also, in implementations, a process may include broadcasting one or more configuration bits from a control register to the plurality of hardware functional units via a control bus. Further, for example, a process may further include autonomously and unilaterally determining, by the individual functional units of the plurality of hardware functional units, how to react to the one or more configuration bits. Additionally, a process may also comprise communicating one or more enable signals from the control register to the at least one of the plurality of hardware functional units via the control bus based at least in part on one or more control data elements stored in the control register.

Embodiments may also include a non-transitory computer-readable medium to store computer-readable code for fabrication of an apparatus comprising a hash value calculation circuit and a plurality of hardware functional units coupled to the hash value calculation circuit via a first bus, wherein the plurality of hardware functional units are individually to autonomously and unilaterally communicate respective sets of data elements to the hash value calculation circuit via the first bus, and wherein, responsive at least in part to at least one of the plurality of hardware functional units placing one or more signals representative of at least a first set of data elements on the first bus, the hash value calculation circuit is to calculate a first hash value based at least in part on the first set of data elements. In implementations, the hash value calculation circuit may calculate the first hash value for a current set of instructions of an instruction sequence test operation based at least in part on the first set of data elements and on a previously calculated hash value for a previous set of instructions of the instruction sequence test operation.

Aspects related to example embodiments and/or implementations mentioned above may be described in greater detail below. Of course, subject matter is not limited in scope to examples described herein.

FIG. 1 is a schematic block diagram illustrating an embodiment of example processing circuitry 100 that may, for example, be subjected to testing (e.g., RIS). In implementations, processing circuitry, such as processing circuitry 100, may comprise a processing pipeline, such as processing pipeline 104, that may include a number of pipeline stages. In implementations, processing pipeline 104 may include fetch circuitry, such as fetch circuitry 130, for fetching program instructions from an instruction cache. For example, processing circuitry may include a first level instruction cache (L1I$), such as L1I$ 120, that may provide a more localized cache of instructions to be provided to fetch circuitry 130. Processing pipeline 104 may also include a decoding stage, such as decoder 140, for decoding fetched program instructions to generate decoded instructions, such as micro-operations, to be processed by remaining stages of processing pipeline 104. Processing pipeline 104 may additionally comprise a rename stage 145 to maintain a speculative mapping between a set of architecturally defined registers and a plurality of physical registers in register file 190, for example.

In implementations, processing pipeline 104 may comprise an issue stage, such as issue/scheduler circuitry 150, for checking whether operands required for decoded micro-operations are ready in register file 190 (e.g., operands have been generated via execution of earlier-issued instructions) and/or for issuing instructions for execution once the required operands for a given instruction are ready. One or more issue queues 160 may hold instructions awaiting issuance to an execute stage 170, for example. Execute stage 170 may include one or more execution units 172 for executing data processing operations corresponding to the instructions at least in part by processing operands read from the register file 190 to generate result values. A writeback stage, such as writeback circuitry 180, may also write the result values back to register file 190. In implementations, availability of results for use as source operands may be communicated by execute stage 170 to issue/scheduler circuitry 150, as indicated in FIG. 1 by a schematic data path 155. Implementations discussed herein may include any of a number of techniques, processes, etc. for communicating availability of operands to issue/scheduler circuitry, such as issue/scheduler circuitry 150.

In implementations, executions unit(s) 172 may include any of a number of processing units for executing different classes or categories of micro-operations. For example, execution units 172 may include one or more of an arithmetic/logic unit (ALU) for performing arithmetic or logical operations, a floating-point unit for performing operations on floating-point values, and/or a branch unit for evaluating outcomes of branch operations. In implementations, execution units 172 may comprise multiple types of execution units so that micro-operations of different categories may be executed in parallel and/or may comprise multiple instances of a particular type of execution unit so that multiple micro-operations of a particular type may be executed in parallel.

In implementations, execution stage 170 may comprise a load/store unit, such as load/store circuitry 174, for performing load/store operations to access data in one or more caches, memories, etc. Processing circuitry 100, for example, may include a first level data cache (L1D$), such as L1D$ 115, a second level cache (L2$), such as L2$ 110, and a main system memory (not shown). Also, as mentioned, L1I$ 120 may provide instructions to fetch circuitry 130, for example.

In implementations, execution stage 170 may include one or more circuits 400 for calculating hash values based at least in part on test stream data, as discussed more fully below.

It may be appreciated that processing circuitry 100 is merely an example, and subject matter is not limited in scope in these respects. It may be further appreciated that FIG. 1 is merely a simplified representation of some components of a possible processor pipeline architecture, and processing circuitry 100, for example, may include other elements not illustrated for conciseness.

As mentioned, integrated circuits capable of executing instructions, such as processors, may be tested via random instruction sequence (RIS) tools and/or techniques, for example, whereby a sequence of executable instructions may be executed and results compared with expected results, for example. In circumstances, development of software test libraries (STL), such as may be utilized in RIS-type testing of processors and/or other device types, may pose challenges in at least a couple of areas. For example, it may be difficult to design a test that checks contents of units outside of the main data processing unit and/or floating point unit. In circumstances, it may be especially difficult to develop such tests to adequately cover fetch/branch prediction circuitry, for example. This may be due to the internal states of those units not being visible to software, for example.

Also, for example, it may be difficult to ascertain the potentially achievable coverage from the beginning of a STL development effort. In circumstances, it may be necessary to add custom hardware to the register transfer level (RTL) of a processor design, for example, to allow for improved coverage. This may be done by providing additional control options and/or observation points to hardware functional units of a processor, for example, either through STL-specific events (e.g., performance monitoring unit (PMU) events) and/or by directly wiring the internal state of the hardware functional units to the data processing unit, for example, to make the internal state visible to software. This process may not be sufficiently efficient as it may result in an ever-expanding address space (e.g., increased numbers of unique PMU events that are to be hidden from customers, increased unique control options, increased numbers of specification updates with their inherent increased wiring that may impact routing, etc.). From a verification point of view, interfaces of the various hardware functional units may require frequent updating, as may testbenches. Also, the reasoning behind the changes may need to be demonstrated and/or their safety impact explained, for example. Further, the increased number of PMU events, for example, may lead to additional verification and/or increasingly complex logic may be needed to reduce observability events into single bit events, for example. These are merely some example issues that may be faced in developing STLs and/or the like to adequately cover at least some hardware functional units.

Embodiments, such as example embodiments and/or implementations described herein, may be directed to addressing the challenges mentioned above. For example, embodiments may be directed to capturing a satisfactory and/or specified percentage of errors and/or to providing satisfactory and/or specified coverage of various circuits, functionalities, etc., of devices under test, for example.

As explained more fully below, embodiments may include interfaces designed and/or built into hardware functional units of a processor, for example, wherein the interfaces are coupled to a hash value calculation circuit via an observation bus. In embodiments, the individual hardware functional units may autonomously and unilaterally place respective sets of data elements on the observation bus (e.g., during an instruction test sequence), and the hash value calculation circuit may calculate a hash value based at least in part on the sets of data elements placed on the observation bus, for example.

In embodiments, interfaces may be standardized and/or may remain static throughout STL development, for example. This may result in future iterations of register transfer logic (RTL) for a device, for example, not impacting the interfaces of the hardware functional units and/or not impacting the testbenches. Also, embodiments may provide flexibility for hardware functional units to unilaterally decide what to expose to software, for example. Localized changes to RTL for a functional hardware unit may be made without negatively impacting other aspects of STL/RIS testing operations and/or development, for example. Additionally, embodiments may provide futureproofing and/or flexibility by allowing observability updates without functional and/or verification impact. Also, for example, embodiments may reduce the complexity of forwarding a micro-architectural event to a software visible point, for example, making STL development more efficient. Of course, these are merely a few example advantages that may be achieved via embodiments described herein.

Figure 2:
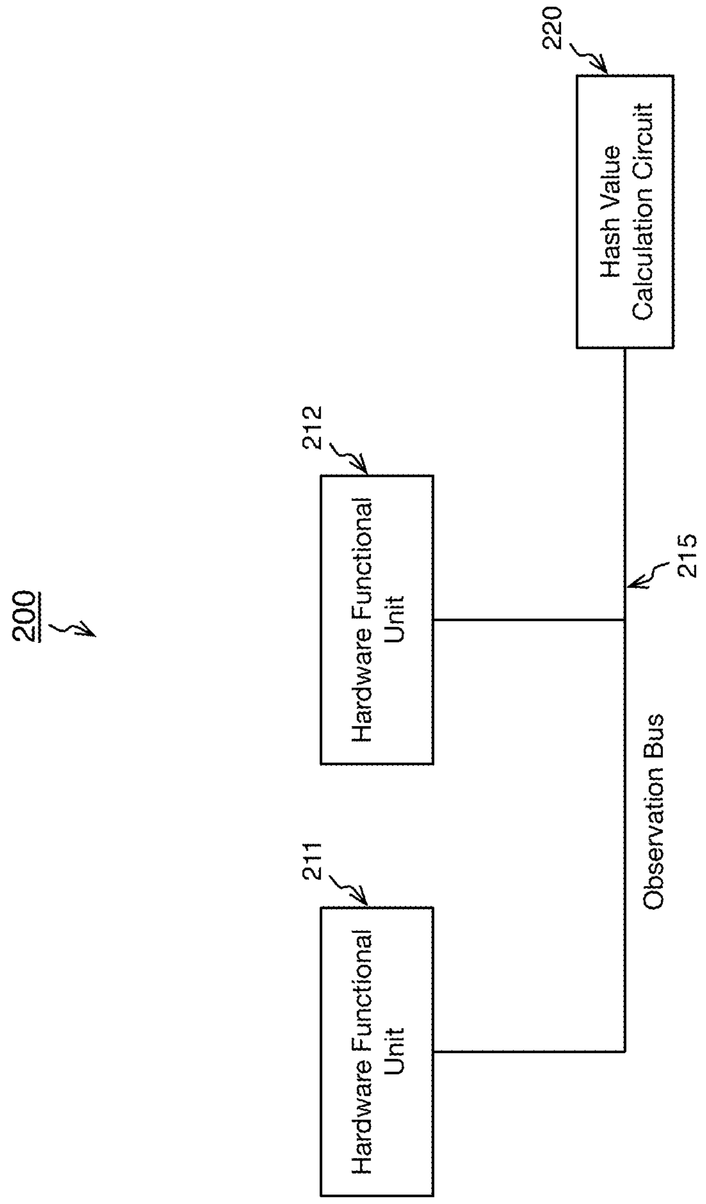
FIG. 2 is a schematic block diagram depicting an example circuit for hash value calculation based, at least in part, on internal data from a plurality of hardware functional units, in accordance with an embodiment.

FIG. 2 is a schematic block diagram depicting an embodiment of an example circuit 200 comprising an example hash value calculation circuit, such as hash value calculation circuit 220, that may calculate hash values based, at least in part, on internal data from a plurality of hardware functional units, such as hardware functional unit 211 and hardware functional unit 212, for example. In implementations, hardware functional unit 211 and/or hardware functional unit 212 may comprise one or more execution units 172 depicted in FIG. 1, for example. Of course, subject matter is not limited in scope in these respects.

In implementations, hardware functional units 211 and/or 212, for example, may include interfaces (e.g., standardized interfaces) that may be coupled to hash value calculation circuit 220 via a bus, such as observation bus 215. In implementations, individual hardware functional units 211 and/or 212 may autonomously and unilaterally place respective sets of data elements on observation bus 215. Further, hash value calculation circuit 220 may calculate a hash value based at least in part on the sets of data elements placed on observation bus 215, for example. In implementations, data elements placed on observation bus 215 by hardware functional units 211 and/or 212, for example, may represent aspects related to the internal states of the individual hardware functional units and/or may represent microarchitectural events, to list but a couple of non-limiting examples. Also, for example, the hash value may be compared with an expected value to detect errors, for example.

In implementations, “autonomously and unilaterally” and/or the like in the context of a hardware functional unit placing data elements on a bus, such as observation bus 215, refers to the hardware functional units generating, determining, selecting, etc. data elements to be placed on an observation bus without regard to any communication, signal, etc., from any external circuit, unit, device, etc. Further, for example, “autonomously and unilaterally” in the context of a hardware functional unit placing data elements on a bus, such as observation bus 215, refers to the hardware functional units driving signals and/or states representative of the data elements onto the observation bus without regard to any handshake and/or acknowledgement communication and/or signal from any external unit. In implementations, individual hardware functional units, such as hardware functional unit 211 and/or hardware functional unit 212, may each place data elements onto observation bus 215 without regard to the other hardware functional unit(s), for example.

As mentioned, hash value calculation circuit 220 may calculate a hash value based on data elements placed on observation bus 215 by hardware functional units 211 and/or 212. In implementations, hash value calculation circuit 220 may calculate cyclic redundancy check (CRC) values, although subject matter is not limited in scope in this respect.

In implementations, hash value calculation circuit 220 may calculate a hash value based at least in part on data elements placed on observation bus 215 and also based at least in part on a previously calculated hash value. For example, an instruction test sequence may include a large number of instructions to be executed. Execution of at least some instructions of an instruction test sequence may include participation from hardware functional units 211 and/or 212, for example. In implementations, hardware functional units 211 and/or 212, for example, may periodically (e.g., after each instruction, after a set of instructions, etc.) place data elements onto observation bus 215. As mentioned, each of the hardware functional units may autonomously and unilaterally determine when to place data elements on observation bus 215 and/or may autonomously and/or unilaterally determine which data elements to place on observation bus 215. In implementations, hash value calculation circuit 220 may periodically (e.g., after each instruction, after a set of instructions, etc.) calculate a hash value based on data elements placed on observation bus 215. In implementations, calculation of a hash value may also be based at least in part on a previously-calculated hash value. For example, a current hash value may be calculated based on data elements obtained from observation bus 215 (e.g., responsive to execution of one or more current instructions) and also based on a previously calculated hash value (e.g., calculated responsive to execution of one or more previous instructions). By basing a hash value on current sets of data elements and on a previously-calculated hash value, any errors that may occur during an instruction test sequence may be propagated so as to track accumulation of error (e.g., as opposed to discrete reporting), for example.

Figure 3:
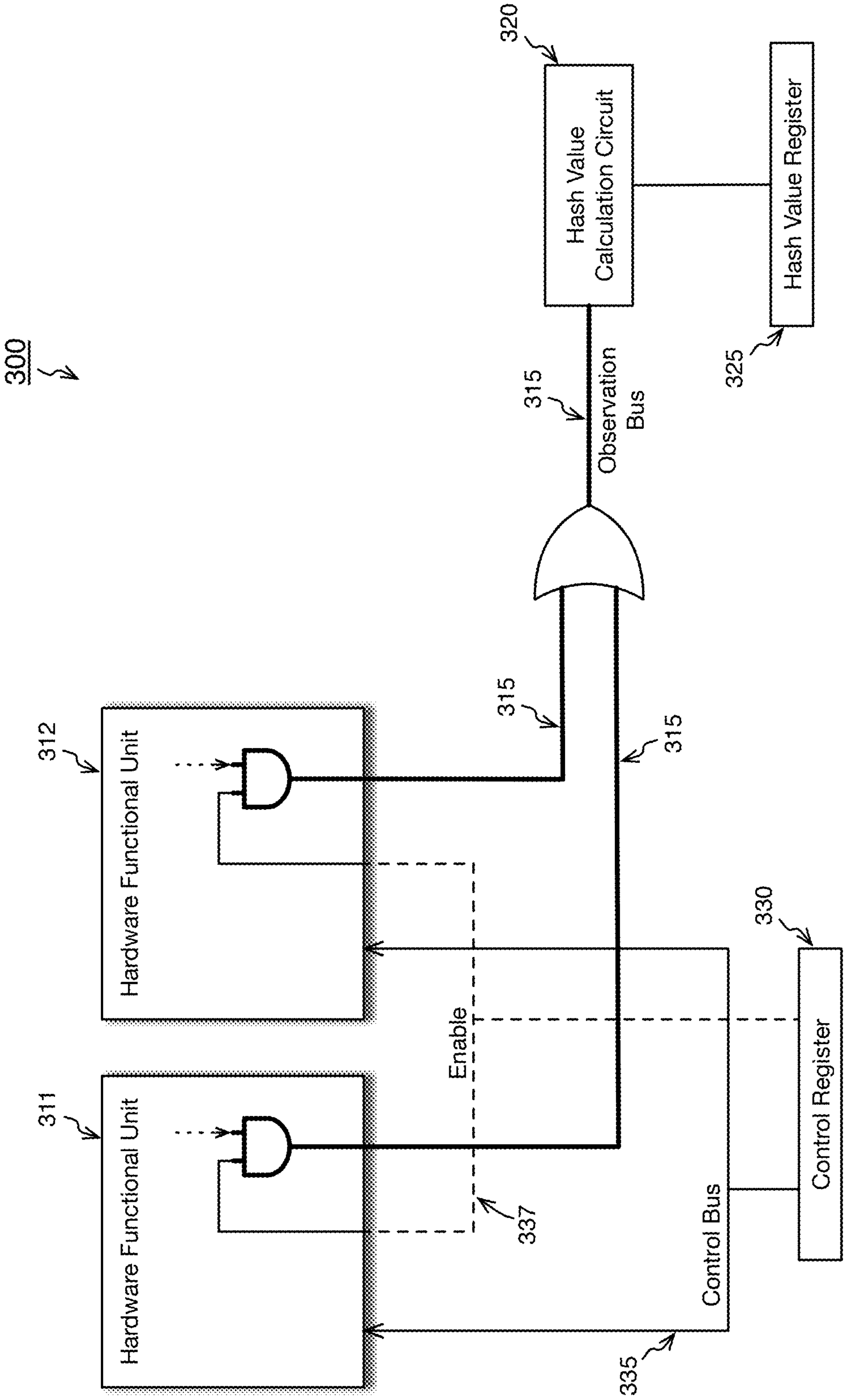
FIG. 3 is a schematic block diagram illustrating an example circuit for tracking of internal data from a plurality of hardware functional units during instruction sequence test operations, in accordance with an embodiment.
Figure 4:
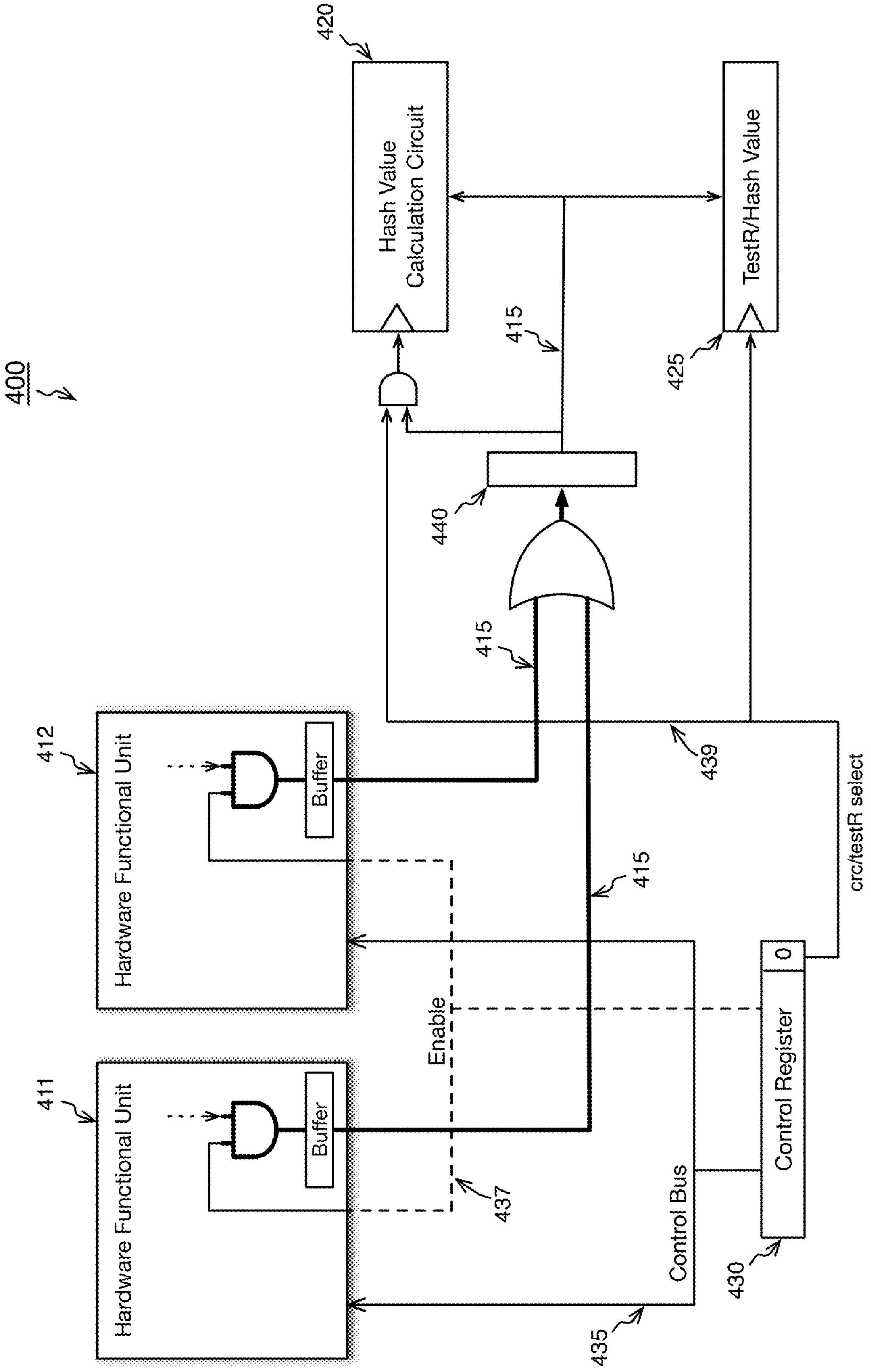
FIG. 4 is a schematic block diagram illustrating an example circuit including a buffered observation bus, in accordance with an embodiment.

FIG. 3 is a schematic block diagram illustrating an embodiment 300 of an example circuit for tracking of internal data from a plurality of hardware functional units, such as during instruction sequence test operations, for example. In general, example circuit 300 may include at least some characteristics and/or attributes discussed above in connection with example circuit 200. For example, circuit 300 may include hardware functional units 311 and/or 312 that may comprise at least some of the characteristics described above for hardware functional units 211 and/or 212. Example circuit 300 may also comprise an observation bus 315, which, again, may comprise at least some characteristics described above for observation bus 215, for example. Although only two hardware functional units are depicted in FIGS. 2-4, subject matter is not limited in scope in this respect. For example, implementations may include a large number of such hardware functional units. Also, subject matter is not limited to any particular type of hardware functional unit. In implementations, hardware functional units 311 and/or 312 may comprise one or more executions units 172 such as depicted in FIG. 1, for example. Also, for example, hardware functional units 311 and/or 312 may comprise a memory controller that may communicate memory attributes and/or status for one or more caches, for example, via data elements placed on observation bus 315. Again, subject matter is not limited in scope in these respects.

As depicted in FIG. 3, example circuit 300 includes some features not shown in FIG. 2 in connection with example circuit 200. For example, circuit 300 comprises a hash value register 325 to store hash values calculated by hash value calculation circuit 320. In implementations, hash value register 325 may be software accessible.

As further depicted in FIG. 3, example circuit 300 may also comprise a control register 330 that may be coupled to hardware functional units 311 and/or 312 by way of a control bus 335. As also depicted, control register 330 may also communicate an enable signal 337 to hardware functional units 311 and/or 312. In implementations, enable signal 337 may indicate that instruction sequence test operations are underway, thereby allowing hardware functional units 311 and/or 312 to individual determine, autonomously and unilaterally, whether to provide internal state and/or event content to hash value calculation circuit 320 by way of observation bus 315. In implementations, control register 330 may be implemented in a data processing unit, such as execution unit 170 depicted in FIG. 1, for example. Also, in implementations, enable signal(s) 337 may be utilized for power management functions. For example, hardware functional units 311 and/or 312 may shut off internal state and/or event reporting responsive to a de-assertion of enable signal(s) 337 to reduce power consumption, in implementations.

In implementations, control signals may be broadcast to hardware functional units 311 and/or 312 via control bus 335 based at least in part on data elements stored in control register 330. In implementations, control signals may be broadcast to each hardware functional unit at least in part to avoid future changes to the interfaces of hardware functional units 311 and/or 312 and/or to avoid future changes to test benches. In implementations, fields of control bus 335 may not have a fixed meaning. Rather, for example, each hardware functional unit may be free to interpret and/or utilize the signals communicated via control bus 335 however it wants. In implementations, individual hardware functional units may select (e.g., autonomously and/or unilaterally) which portion(s) of their respective internal state to be exposed to software (e.g., via a hash value calculated by hash value calculation circuit 320). As mentioned, selected internal state and/or event content may be communicated to hash value calculation circuit 320 via observation bus 315.

In implementations, hardware functional units 311 and/or 312, for example, may communicate data elements to hash value calculation circuit 320 via broadcast messaging (e.g., no acknowledgement and/or no handshake) via observation bus 315. In implementations, a single hardware functional unit may place data elements on observation bus at any given time. However, in other implementations, more than one hardware functional unit may place data elements on observation bus 315 at a given time. Such features may be up to the design of the individual hardware functional units and may not impact STL development, for example.

Similar to what was explained above in connection with example circuit 200, a current hash value may be calculated (e.g., responsive to execution of one or more current instructions) based on data elements obtained from observation bus 315 and also based on a previously calculated hash value (e.g., calculated responsive to execution of one or more previous instructions) stored in hash value register 325. By basing a current hash value on current data elements and on a previously-calculated hash value, accumulation of errors may be tracked across an instruction test sequence. In implementations, a final hash value at the end of an instruction test sequence may be compared against an expected or "golden" value to determine whether any errors occurred. Further, the hash value may comprise a compressed representation of the internal states and/or events communicated to hash value calculation circuit 320 by hardware functional units 311 and/or 312, for example. In implementations, the internal state and/or event content represented by the hash value may be utilized in analyzing any errors that may be reported during an instruction test sequence, for example.

FIG. 4 is a schematic block diagram illustrating an embodiment of an example circuit 400. In general, example circuit 400 may include at least some characteristics and/or attributes discussed above in connection with example circuits 200 and/or 300. For example, circuit 400 may include hardware functional units 411 and/or 412 that may comprise at least some of the characteristics described above for hardware functional units 211, 212, 311, and/or 312. Example circuit 400 may also comprise an observation bus 415, which, again, may comprise at least some characteristics described above for observation bus 215 and/or 315, for example. Also, example circuit 400 may comprise a control bus that may comprise at least some characteristics and/or attributes similar to those discussed above for control bus 335. Enable signal(s) 437 may also share at least some attributes and/or characteristics with enable signal(s) 337 discussed above. Further, example circuit 400 comprises hash value calculation circuit 420 that may share at least some characteristics and/or attributes with its counterparts discussed above in connection with example circuits 200 and/or 300.

As depicted in FIG. 4, example circuit 400 includes some features not shown in FIGS. 2 and/or 3 in connection with example circuits 200 and/or 300. For example, observation bus 415 may comprise a buffered observation bus. In implementations, one or more buffers 440 may be included on observation bus 415 and/or one or more buffers may be included within hardware functional units 411 and/or 412. For example, the buffering may be provided to account for timing difference between different circuits and/or functional units and/or may allow for internal slicing (e.g., within hardware functional units 411 and/or 412) to make timing easier. Of course, subject matter is not limited in scope in these respects.

In implementations, control bus 435 may comprise a 16-bit bus. Also, for example, observation bus 415 may comprise a 16-bit bus. Of course, subject matter is not limited in scope in these respects.

FIG. 4 further depicts a crc/testR select signal 439. In implementations, crc/testR select signal 439 may toggle between a hash value calculation mode of operation and a test register (TestR) mode (e.g., event counting) that may be provided for backward compatibility. In implementations, a Oth bit of control register 430 may specify a mode of operation. For example, an assertion of crc/testR select signal 439 may signal hash value calculation circuit 420 to begin/resume hash value calculation and/or accumulation. Further, in another implementation, the Oth bit of control register 430 may comprise a 1-bit enable signal that may trigger a new hash value calculation. Additionally, in implementations, for the TestR mode of operation, the crc/testR select signal 439 may be placed in a de-asserted state in accordance with an appropriate value being written to the Oth bit of control register 430. In the TestR mode of operation, no hash calculations are involved, for example. Rather, observation bus 415 may be utilized to gather values into TestR/Hash Value register 425. For example, TestR/Hash Value register 425 may comprise sticky storage for observation bus 425. In implementations, one or more hardware functional units 411 and/or 412 may signal particular events to TestR/Hash Value register 425. For example, STL-specific events (e.g., performance monitoring unit (PMU) events) and/or other events related to the internal states of the hardware functional units may be communicated to TestR/Hash Value register 425 via observation bus 415 while in the TestR mode of operation. Additionally, for example, TestR/Hash Value register 425 may be exposed to software (e.g., accessible via software). Again, subject matter is not limited in scope in these respects Also, in implementations, enable signal(s) 437 may be utilized for power management functions. For example, hardware functional units 411 and/or 412 may shut off internal state and/or event reporting responsive to a de-assertion of enable signal(s) 437 to reduce power consumption, in implementations.

Figure 5:
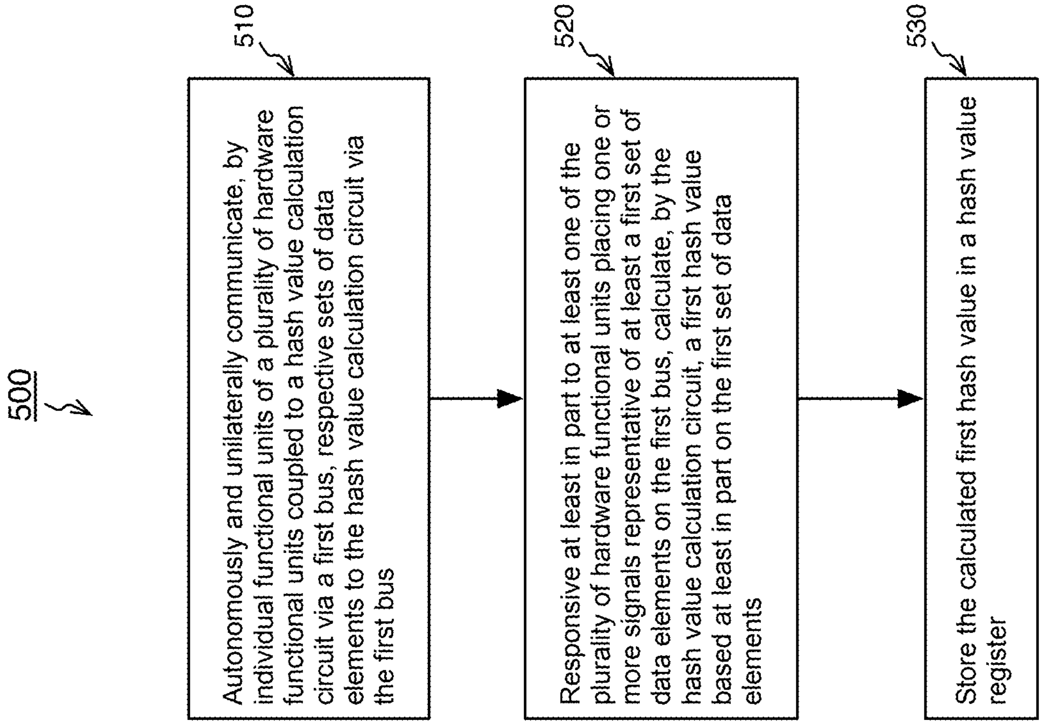
FIG. 5 is a flow diagram depicting an example process for calculating a hash value based, at least in part, on internal data from a plurality of hardware functional units, in accordance with an embodiment.

FIG. 5 is a flow diagram depicting an embodiment of an example process 500 for calculating a hash value based, at least in part, on internal data from a plurality of hardware functional units, such as hardware functional units 211, 212, 311, 312, 411, and/or 412. Embodiments may include all of the operations described, fewer than the operations described, and/or more than the operations described for example process 500. Likewise, it should be noted that content acquired or produced, such as, for example, input signals, output signals, operations, results, etc. associated with the example provided may be represented via one or more analog and/or digital signals and/or signal packets. It should also be appreciated that even though one or more operations, processes, techniques, approaches, etc. are illustrated or described concurrently or with respect to a certain sequence, other sequences or concurrent operations may be employed. In addition, although the description below references particular aspects and/or features illustrated in certain other figures, one or more operations, processes, techniques, approaches, etc. may be performed with other aspects and/or features.

In implementations, example process 500 may include an operation by individual functional units of a plurality of hardware functional units (e.g., hardware functional units 211, 212, 311, 312, 411, and/or 412) to autonomously and unilaterally communicate respective sets of data elements to a hash value calculation circuit (e.g., hash value calculation circuit 220, 320, and/or 430) via a first bus (e.g., observation bus 215, 315, and/or 415), as indicated at block 510 shown in FIG. 5.

Also, in implementations, example process 500 may include an operation to calculate, by the hash value calculation circuit (e.g., hash value calculation circuit 220, 320, and/or 430), a first hash value based at least in part on a first set of data elements responsive at least in part to at least one of the plurality of hardware functional units (e.g., hardware functional units 211, 212, 311, 312, 411, and/or 412) placing one or more signals representative of at least a first set of data elements on the first bus (e.g., observation bus 215, 315, and/or 415), as indicated at block 520 of FIG. 5. Further, as indicated at block 530, the calculated hash value may be stored in a hash value register (e.g., hash value register 325 and/or 425).

Further, in implementations, an example process may include calculating, by the hash value calculation circuit (e.g., hash value calculation circuit 220, 320, and/or 430), a plurality of successive hash values for a plurality of successive sets of instructions of an instruction test sequence operation based at least in part on one or more additional sets of data elements and based at least in part on at least one previously calculated hash value, as discussed above. In implementations, a "set of instructions" may comprise one or more instructions.

Figure 6:
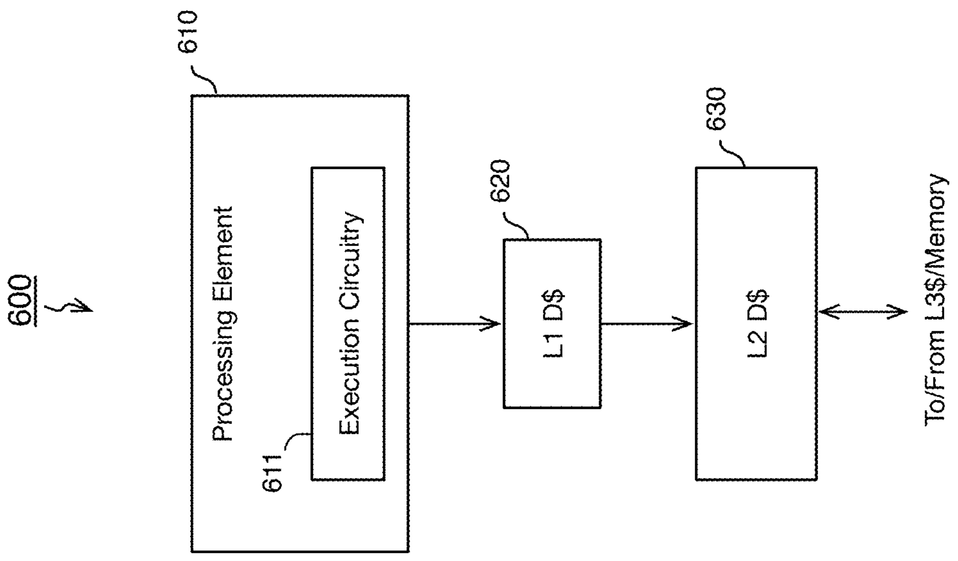
FIG. 6 is a schematic block diagram illustrating an example apparatus including a processing element and data caches, in accordance with an embodiment.

FIG. 6 illustrates an example of an apparatus 600 comprising a processing element 610 (e.g. a CPU or GPU) comprising execution circuitry 611 for executing processing operations in response to decoded program instructions. Processing element 610 may have access to a first-level data cache (L1D$) 620 and a second level data cache (L2D$) 630, which may comprise part of a cache hierarchy including multiple caches for caching data from memory that is accessible by processing element 610 in response to load/store operations executed by the execution circuitry 611, for example. Example embodiments and/or implementations of processing circuitry and/or execution circuitry are described herein in connection with FIGS. 1-5, for example.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define an HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioral representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII, for example. The one or more netlists or other computer-readable representation of integrated circuit components may be generated by applying one or more logic synthesis processes to an RTL representation to generate definitions for use in fabrication of an apparatus embodying embodiments, such as those described herein, for example.

Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly, for example.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying embodiments, such as those described herein, for example. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept, for example.

Embodiments may also be described, at least in part, by the following numbered clauses: Clause 1. An apparatus, comprising: a hash value calculation circuit; and a plurality of hardware functional units coupled to the hash value calculation circuit via a first bus, wherein the plurality of hardware functional units are individually to autonomously and unilaterally communicate respective sets of data elements to the hash value calculation circuit via the first bus; wherein, responsive at least in part to at least one of the plurality of hardware functional units placing one or more signals representative of at least a first set of data elements on the first bus, the hash value calculation circuit to calculate a first hash value based at least in part on the first set of data elements.

Clause 2. The apparatus of clause 1, wherein the hash value calculation circuit is to calculate the first hash value for a current set of instructions of an instruction sequence test operation based at least in part on the first set of data elements and on a previously calculated hash value for a previous set of instructions of the instruction sequence test operation.

Clause 3. The apparatus of any of the aforementioned clauses, wherein the hash value calculation circuit is further to calculate a plurality of successive hash values for a respective plurality of successive sets of instructions of the instruction sequence test operation based at least in part on one or more additional sets of data elements and further based at least in part on at least one previously calculated hash value from at least one previous set of instructions of the plurality of successive sets of instructions.

Clause 4. The apparatus of any of the aforementioned clauses, further including a hash value register to store the calculated first hash value.

Clause 5. The apparatus of any of the aforementioned clauses, further comprising: a control register; and a control signal path to couple the control register to the plurality of hardware functional units; wherein the control register to broadcast one or more configuration bits to the plurality of hardware functional units via the control signal path.

Clause 6. The apparatus of any of the aforementioned clauses, wherein the plurality of hardware functional units are individually to autonomously and unilaterally determine how to react to the one or more configuration bits.

Clause 7. The apparatus of any of the aforementioned clauses, further comprising a second control register and a second bus to couple the second control register to the plurality of hardware functional units, wherein the second bus is to communicate one or more enable signals to the at least one of the plurality of hardware functional units based at least in part on one or more second control data elements stored in the second control register.

Clause 8. The apparatus of any of the aforementioned clauses, wherein the at least one of the plurality of hardware functional units is to place the one or more signals representative of the at least the first set of data elements on the first bus responsive at least in part to the one or more enable signals.

Clause 9. The apparatus of any of the aforementioned clauses, wherein the hash value calculation circuit is to calculate the first hash value and/or one or more additional hash values responsive at least in part to a hash value calculation enable signal communicated via the second control bus in accordance with a hash value calculation enable bit of the second control register.

Clause 10. The apparatus of any of the aforementioned clauses, wherein the at least one of the plurality of hardware functional units is to comprise a first buffer to temporarily store the first set of data elements prior to placing the first set of data elements on the first bus.

Clause 11. The apparatus of any of the aforementioned clauses, further comprising a second buffer to temporarily store at least the first set of data elements placed on the first bus, wherein the second buffer is to provide the at least the first set of data elements to the hash value calculation circuit.

Clause 12. The apparatus of any of the aforementioned clauses, comprising a processor core comprising a data processing unit and further comprising the plurality of hardware functional units, wherein the data processing unit is to comprise the hash value calculation circuit.

Clause 13. The apparatus of any of the aforementioned clauses, wherein the respective sets of data elements for the plurality of hardware functional units comprise signals and/or states representative of internal state content for the respective plurality of hardware functional units.

Clause 14. The apparatus of any of the aforementioned clauses, wherein, to autonomously and unilaterally communicate the respective sets of data elements to the hash value calculation circuit, the plurality of hardware functional units are individually to autonomously and unilaterally: select which content to include in the respective sets of data elements; and/or determine when to place the respective sets of data elements onto the first bus.

Clause 15. A method, comprising: autonomously and unilaterally communicating, by individual functional units of a plurality of hardware functional units coupled to a hash value calculation circuit via a first bus, respective sets of data elements to the hash value calculation circuit via the first bus; responsive at least in part to at least one of the plurality of hardware functional units placing one or more signals representative of at least a first set of data elements on the first bus, calculating, by the hash value calculation circuit, a first hash value based at least in part on the first set of data elements; and storing the calculated first hash value in a hash value register.

Clause 16. The method of clause 15, further comprising calculating, by the hash value calculation circuit, a plurality of successive hash values for a plurality of successive sets of instructions of an instruction sequence test operation based at least in part on one or more additional sets of data elements and based at least in part on at least one previously calculated hash value.

Clause 17. The method of any of clauses 15-16, further comprising broadcasting one or more configuration bits from a control register to the plurality of hardware functional units via a control bus.

Clause 18. The method of any of clauses 15-17, further comprising autonomously and unilaterally determining, by the individual functional units of the plurality of hardware functional units, how to react to the one or more configuration bits.

Clause 19. The method of any of clauses 15-18, further comprising: communicating one or more enable signals from the control register to the at least one of the plurality of hardware functional units via the control bus based at least in part on one or more control data elements stored in the control register.

Clause 20. A non-transitory computer-readable medium to store computer-readable code for fabrication of an apparatus comprising: a hash value calculation circuit; and a plurality of hardware functional units coupled to the hash value calculation circuit via a first bus, wherein the plurality of hardware functional units are individually to autonomously and unilaterally communicate respective sets of data elements to the hash value calculation circuit via the first bus; wherein, responsive at least in part to at least one of the plurality of hardware functional units placing one or more signals representative of at least a first set of data elements on the first bus, the hash value calculation circuit to calculate a first hash value based at least in part on the first set of data elements.

It will be clear to one skilled in the art that many improvements and modifications can be made to the foregoing exemplary embodiments without departing from the scope of the present techniques.

What is claimed is:

1. An apparatus, comprising:

a hash value calculation circuit; and a plurality of hardware functional units coupled to the hash value calculation circuit via a first bus, wherein the plurality of hardware functional units are individually to autonomously and unilaterally communicate respective sets of data elements representative of internal state content to the hash value calculation circuit via the first bus, wherein the plurality of hardware functional units are individually to autonomously and unilaterally determine times to place the respective sets of data elements on the first bus;

wherein, responsive at least in part to at least one of the plurality of hardware functional units placing one or more signals representative of at least a first set of data elements on the first bus, the hash value calculation circuit to calculate a first hash value based at least in part on the first set of data elements.

2. The apparatus of claim 1, wherein the hash value calculation circuit is to calculate the first hash value for a current set of instructions of an instruction sequence test operation based at least in part on the first set of data elements and on a previously calculated hash value for a previous set of instructions of the instruction sequence test operation.

3. The apparatus of claim 2, wherein the hash value calculation circuit is further to calculate a plurality of successive hash values for a respective plurality of successive sets of instructions of the instruction sequence test operation based at least in part on one or more additional sets of data elements placed on the first bus by one or more of the plurality of hardware functional units and further based at least in part on at least one previously calculated hash value from at least one previous set of instructions of the plurality of successive sets of instructions.

4. The apparatus of claim 1, further including a hash value register to store the calculated first hash value.

5. The apparatus of claim 1, further comprising:

a control register; and a control signal path to couple the control register to the plurality of hardware functional units;

wherein the control register to broadcast one or more configuration bits to the plurality of hardware functional units via the control signal path.

6. The apparatus of claim 5, wherein the plurality of hardware functional units are individually to autonomously and unilaterally determine how to react to the one or more configuration bits.

7. The apparatus of claim 6, further comprising a second control register and a second control bus to couple the second control register to the plurality of hardware functional units, wherein the second control bus is to communicate one or more enable signals to the at least one of the plurality of hardware functional units based at least in part on one or more second control data elements stored in the second control register.

8. The apparatus of claim 7, wherein the at least one of the plurality of hardware functional units is to autonomously and unilaterally determine times to place the one or more signals representative of the at least the first set of data elements on the first bus responsive at least in part to the one or more enable signals.

9. The apparatus of claim 7, wherein the hash value calculation circuit is to calculate the first hash value and/or one or more additional hash values responsive at least in part to a hash value calculation enable signal communicated via the second control bus in accordance with a hash value calculation enable bit of the second control register.

10. The apparatus of claim 1, wherein the at least one of the plurality of hardware functional units is to comprise a first buffer to temporarily store the first set of data elements prior to placing the first set of data elements on the first bus.

11. The apparatus of claim 10, further comprising a second buffer to temporarily store at least the first set of data elements placed on the first bus, wherein the second buffer is to provide the at least the first set of data elements to the hash value calculation circuit.

12. The apparatus of claim 1, comprising a processor core comprising a data processing unit and further comprising the plurality of hardware functional units, wherein the data processing unit is to comprise the hash value calculation circuit.

13. The apparatus of claim 1, wherein, to autonomously and unilaterally communicate the respective sets of data elements to the hash value calculation circuit, the plurality of hardware functional units are individually to autonomously and unilaterally select which content to include in the respective sets of data elements.

14. A method, comprising:

autonomously and unilaterally communicating, by individual hardware functional units of a plurality of hardware functional units coupled to a hash value calculation circuit via a first bus, respective sets of data elements representative of internal state content to the hash value calculation circuit via the first bus, wherein the plurality of hardware functional units are individually to autonomously and unilaterally determine times to place the respective sets of data elements on the first bus;

responsive at least in part to at least one of the plurality of hardware functional units placing one or more signals representative of at least a first set of data elements on the first bus, calculating, by the hash value calculation circuit, a first hash value based at least in part on the first set of data elements; and storing the calculated first hash value in a hash value register.

15. The method of claim 14, further comprising calculating, by the hash value calculation circuit, a plurality of successive hash values for a plurality of successive sets of instructions of an instruction sequence test operation based at least in part on one or more additional sets of data elements and based at least in part on at least one previously calculated hash value.

16. The method of claim 14, further comprising broadcasting one or more configuration bits from a control register to the plurality of hardware functional units via a control bus.

17. The method of claim 16, further comprising autonomously and unilaterally determining, by the individual hardware functional units of the plurality of hardware functional units, how to react to the one or more configuration bits.

18. The method of claim 16, further comprising:

communicating one or more enable signals from the control register to the at least one of the plurality of hardware functional units via the control bus based at least in part on one or more control data elements stored in the control register.

19. A non-transitory computer-readable medium to store computer-readable code for fabrication of an apparatus comprising:

a hash value calculation circuit; and a plurality of hardware functional units coupled to the hash value calculation circuit via a first bus, wherein the plurality of hardware functional units are individually to autonomously and unilaterally communicate respective sets of data elements representative of internal state content to the hash value calculation circuit via the first bus, wherein the plurality of hardware functional units are individually to autonomously and unilaterally determine times to place the respective sets of data elements on the first bus;

wherein, responsive at least in part to at least one of the plurality of hardware functional units placing one or more signals representative of at least a first set of data elements on the first bus, the hash value calculation circuit to calculate a first hash value based at least in part on the first set of data elements.

* * * * *